T. B. FUNK.
HUB BEARING.
APPLICATION FILED MAY 3, 1920.
1,378,588.
Patented May 17, 1921.
2 SHEETS—SHEET 1.
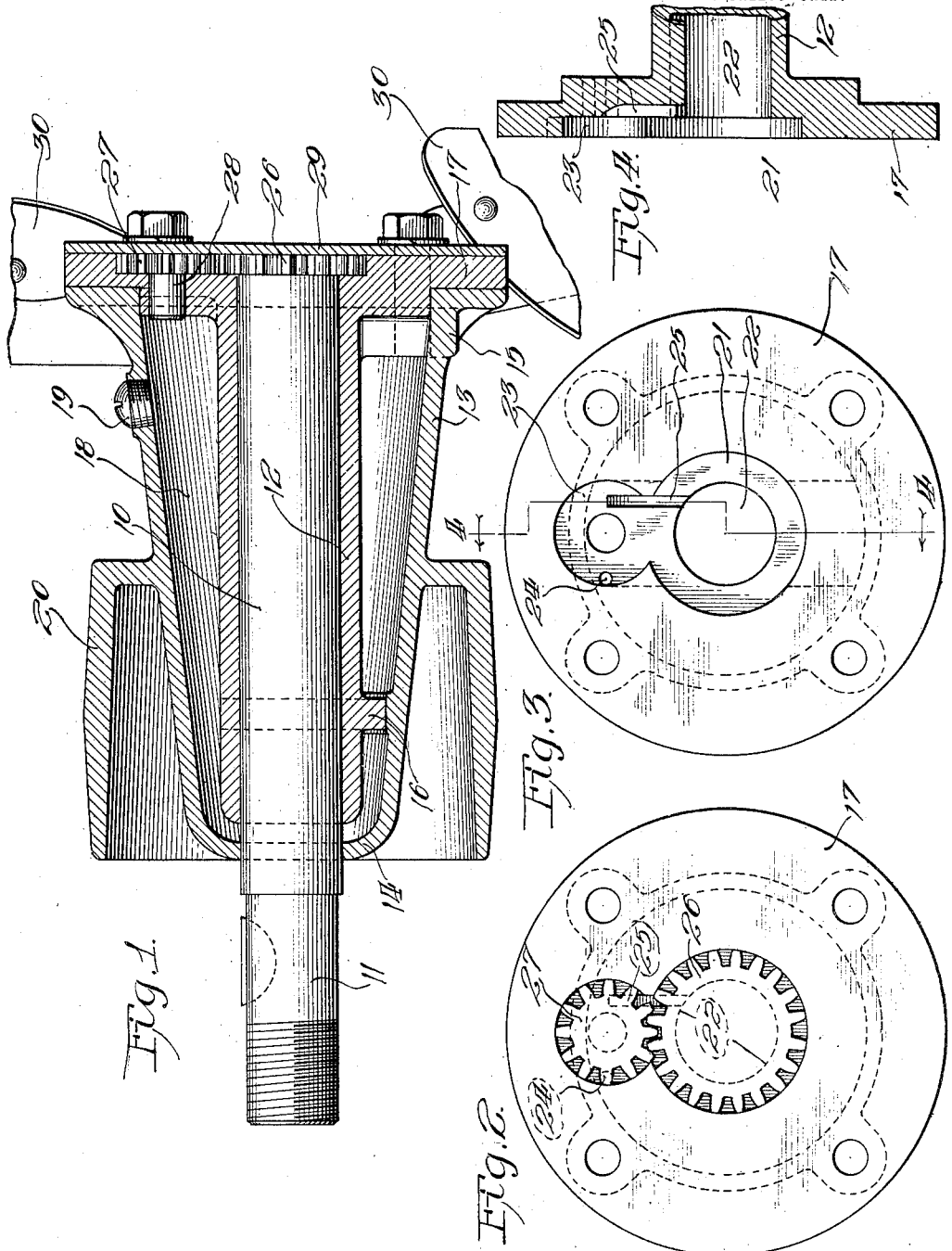
Witness:
Harry S. Gaither
Inventor:
Truman B. Funk
by Banning & Banning
Attys.

T. B. FUNK.
HUB BEARING.
APPLICATION FILED MAY 3, 1920.
1,378,588.
Patented May 17, 1921.
2 SHEETS—SHEET 2.
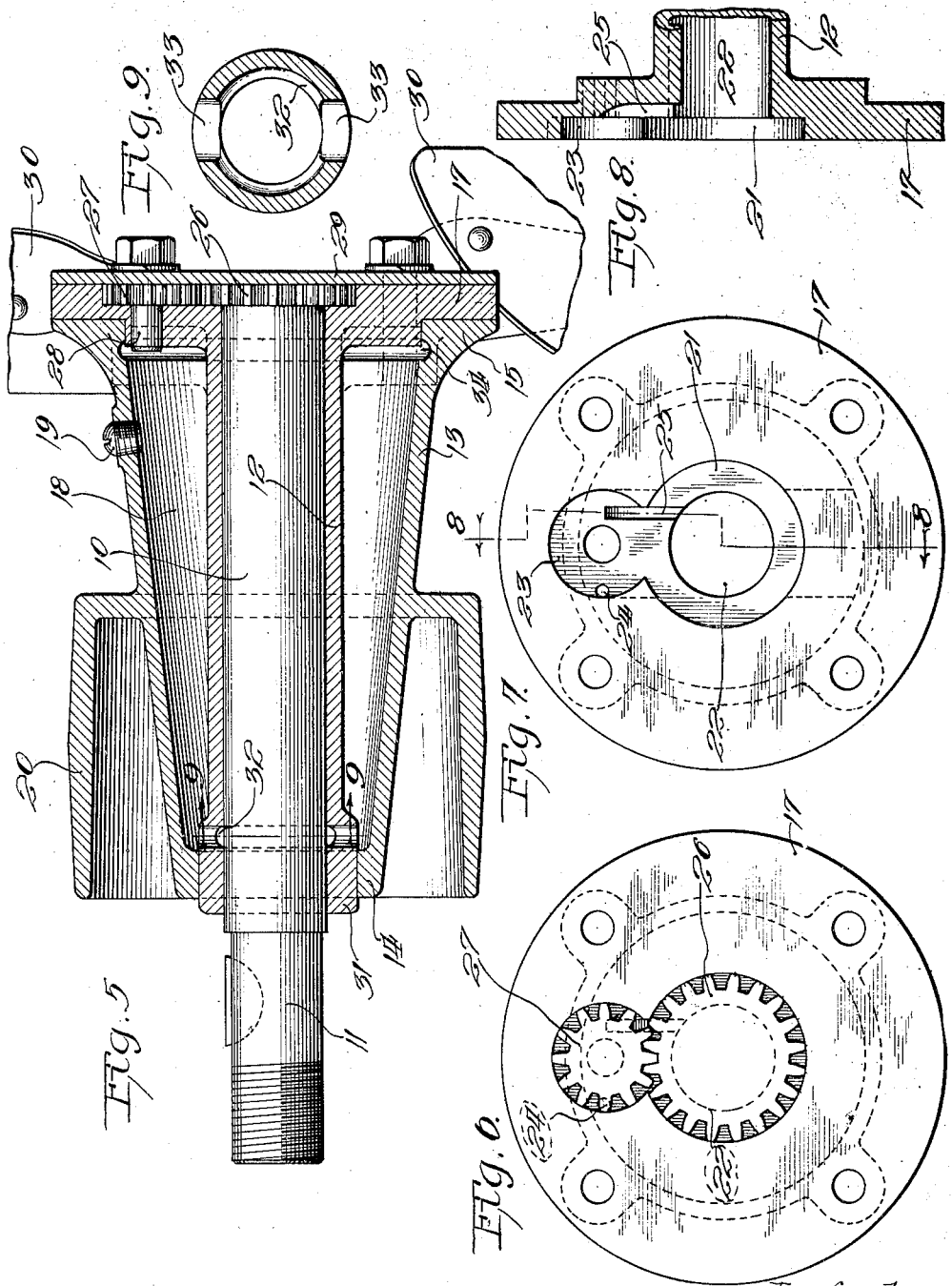
Witness:
Harry S. Gaither
Inventor:
Truman B. Funk
by Banning & Banning
Attys.

UNITED STATES PATENT OFFICE.

TRUMAN B. FUNK, OF MOLINE, ILLINOIS.

HUB-BEARING.

1,378,588.  Specification of Letters Patent.  Patented May 17, 1921.

Application filed May 3, 1920. Serial No. 378,462.

*To all whom it may concern:*

Be it known that I, TRUMAN B. FUNK, a citizen of the United States, residing at Moline, in the county of Rock Island and State of Illinois, have invented certain new and useful Improvements in Hub-Bearings, of which the following is a specification.

The present invention has to do with certain improvements in bearings. The invention has reference particularly to the construction and arrangement of parts which are lubricated by means of oil or lubricant circulated under pressure. The features of the invention are very well adapted for use in bearings for automobile fans and the like, although it will presently appear that the features of the invention may also be used in other locations and for lubrication of other bearings. Nevertheless, inasmuch as the features of the invention are especially well adapted for lubrication of automobile fan bearings, I have illustrated the invention and will describe the same as being applied to this particular type of bearing.

One of the objects of the present invention is to provide a bearing of very simple construction and one which can be made cheaply and from a minimum number of parts.

Another object of the invention is to provide a bearing for fans and the like, which will be self-contained, and of which the parts are so formed that they can be very easily cast and put through the various manufacturing operations.

Other objects and uses of the invention will appear from a detailed description of the same which consists in the features of construction and combinations of parts hereinafter described and claimed.

In the drawings:

Figure 1 shows a longitudinal section through an improved form of bearing embodying the features of the present invention;

Fig. 2 shows an end view of the bearing structure with the fan plate removed, and showing the gears in position;

Fig. 3 shows a view corresponding to Fig. 2, with the exception that the gears and stud have been removed;

Fig. 4 shows a section taken on the line 4—4 of Fig. 3, looking in the direction of the arrows;

Fig. 5 shows a longitudinal section through a modified form of bearing embodying the features of the invention;

Fig. 6 shows an end view of the bearing and gears, the fan plate being removed;

Fig. 7 shows a view corresponding to Fig. 6, with the exception that the gears and stud have been removed;

Fig. 8 shows a section taken on the line 8—8 of Fig. 7, looking in the direction of the arrows; and Fig. 9 shows a detailed section taken on the line 9—9 of Fig. 5, looking in the direction of the arrows.

I will first describe the construction shown in detail in Figs. 1 to 4 inclusive. In this case, there is provided a stud or pin 10, the end portion of which is fixed to a stationary part such as the engine frame, and the body portion of which serves as a shaft or support for the bearing. The body portion of the bearing comprises an inner sleeve 12 which seats directly upon the pin 10, and an outer shell member 13 which encircles but is spaced away from said sleeve. The shell member 13 tapers from its inner end 14 to its outer peripheral portion 15, the inner end 14 being drawn inwardly and closely encircling the stud or pin 10.

A series of separated lugs 16 are provided on the inner end of the sleeve 12 (only one of said lugs appearing in Fig. 1). These lugs serve to further support the inner end of the shell 13 while permitting oil or lubricant to circulate freely past the lugs. The outer end of the sleeve 12 is flared outwardly to provide a flange 17; and the outer end 15 of the shell 13 seats against the periphery of said flange to which it may be secured in any suitable manner. This arrangement serves to inclose an oil space or chamber 18 between the sleeve and shell, and a plug 19 may be used to close an opening through which said chamber may be filled from time to time. A pulley flange 20 may be formed integral with the shell 13, as clearly evident from Fig. 1.

In the outer face of the flange portion 17 may be provided a circular recess 21 concentric with the stud or pin 10, and a hole 22 is formed at the center of said recess to receive the end portion of said stud or pin. Another circular recess 23 is formed in the outer face of the flange 17 and merges segmentally with the recess 21. An oil perforation 24 extends through the flange from the recess 23 to the inner or back face of the flange; and a slotted recess 25 extends between the circular recesses 21 and 23 at the point where the teeth of gears operating or located in said recesses will mesh.

On the end of the stud or pin 10, or formed integrally therewith, as desired, is a gear 26, the teeth of which closely engage the circular wall of the recess. A pinion 27 is located within the recess 23 and its teeth closely engage the wall of said recess, and also mesh with the teeth of the gear 26. The pinion 27 is mounted on a stud 28 in the flange 17. The arrangement is such that oil drawn through the perforation 24 will be carried around by the teeth of the pinion 27 to the point where the teeth of the pinion and gear come together, and will then be forced down through the slotted passage 25 and against the stud or pin 10. Said oil will then be compelled to travel along the stud or pin and lubricate the same. It will finally work its way through and be delivered adjacent the inner end 14 of the shell. A fan plate 29 seats over and is secured to the flange 17 and carries the fan blades 30, if the same be used. This plate 29 also closely engages the gear and pinion aforesaid so as to insure the flow of oil in the manner just explained.

It will be observed from an examination of this construction that it makes use of parts which may be very easily cast in molds of very simple forms, and from a minimum number of parts. It will also be observed that this construction involves the use of a sleeve seated directly upon the stud or pin, and having its outer end flanged in conjunction with an encircling shell which engages the peripheral portion of said flange.

Referring now to the construction shown in Figs. 5 to 9 inclusive, the same is a modification of that just described in detail. In this present case, the sleeve 12 has its inner end 31 carried beyond the inner end 14 of the shell 13, so that said inner end 14 is directly supported by the sleeve 12. Furthermore, a groove 32 is provided encircling the inner face of the sleeve 12 adjacent to the inner end 31 thereof so as to collect the oil flowing along the stud or pin and deliver the same into the space or chamber 18 through the medium of a series of openings 33. It is also observed that on the inner face of the shell 13 adjacent to its outer end 15 there is provided an encircling groove 34 for the purpose of insuring a perfect seal between said outer end 15 and the flanged portion 17. It is also observed that the lugs 16 of the arrangement shown in Figs. 1, 2, 3, and 4, are dispensed with in the present case, since the inner end of the shell is directly supported by the inner end of the sleeve.

While I have herein shown and described certain embodiments of my present invention, still I do not limit myself to the said embodiments except as I may do so in the claims.

I claim:

1. A pressure lubricated bearing comprising, in combination, a stationary stud, a sleeve journaled thereon, an outstanding flange at the outer end of said sleeve, a concentric shell surrounding said sleeve and spaced away therefrom to provide an annular oil space, the inner end of the shell being supported by the inner end of the sleeve, and the outer end of the shell being in engagement with the peripheral portion of the sleeve flange to inclose the oil space aforesaid, there being a circular recess in the outer face of the sleeve flange concentric with respect to the stud, a gear located in said recess and rigid with respect to the stud, there being another circular recess in the outer face of the sleeve flange and in peripheral communication with the first mentioned recess, a pinion rotatably mounted in the second mentioned recess, a cover plate extending over the gear and pinion and said recesses and serving, in conjunction with the sleeve flange, to inclose said recesses, there being an oil passage extending through the sleeve flange and establishing communication between the oil space and the path of travel of the pinion teeth, and there being another recess establishing communication between the point of enmeshment of the teeth of the pinion and gear and the end of the stud, substantially as described.

2. A pressure lubricated bearing comprising, in combination, a stationary stud, a sleeve journaled thereon, an outstanding flange at the outer end of said sleeve, a concentric shell surrounding said sleeve and spaced away therefrom to provide an annular oil space, the inner end of the shell being supported by the inner end of the sleeve, and the outer end of the shell being in engagement with the peripheral portion of the sleeve flange to inclose the oil space aforesaid, a cover plate in conjunction with the sleeve flange aforesaid, there being a pair of circular peripherally communicating recesses between the sleeve flange and cover plate, one of said recesses being concentric with respect to the stud, a gear in said concentric recess and rigid with respect to the stud, and a pinion in the other recess meshing with the gear, there being a passage extending through the sleeve and establishing communication between the oil space and the path of travel of the pinion teeth, and there being a passage establishing communication between the point of enmeshment of the pinion and gear teeth and the end of the stud, substantially as described.

3. A pressure lubricated bearing comprising, in combination, a stationary stud, a pair of concentric members thereon, one of said members being journaled on the stud, one of the members having a peripheral flange extending to the other member and serving, in conjunction therewith, to inclose an oil space, the inner ends of the members being relatively stationary and inclosing the oil space at that end, a cover plate in conjunction with the flange aforesaid, there being a pair of circular peripherally communicating recesses between the flange and cover plate, one of said recesses being concentric with respect to the stud, a gear in said recess rigid with respect to the stud, a pinion in the other recess meshing with the gear, there being a passage extending through the flange and establishing communication between the oil space and the path of travel of the pinion teeth, there being another passage extending between the point of enmeshment of the pinion and gear teeth and the end of the stud, substantially as described.

TRUMAN B. FUNK.